United States Patent
Danielson et al.

(10) Patent No.: US 7,120,319 B2
(45) Date of Patent: Oct. 10, 2006

(54) DATA CAPTURE APPARATUS WITH HANDWRITTEN DATA RECEIVING COMPONENT

(75) Inventors: Arvin D. Danielson, Solon, IA (US); Dennis A. Durbin, Cedar Rapids, IA (US); David C. Hacker, Jacksonville, FL (US); Jerry L. Walter, Marion, IA (US)

(73) Assignee: Broadcom Corporation, Irvine, CA (US)

( * ) Notice: Subject to any disclaimer, the term of this patent is extended or adjusted under 35 U.S.C. 154(b) by 449 days.

(21) Appl. No.: 10/085,468

(22) Filed: Feb. 28, 2002

(65) Prior Publication Data

US 2003/0081860 A1 May 1, 2003

Related U.S. Application Data

(63) Continuation of application No. 09/135,771, filed on Aug. 18, 1998, which is a continuation of application No. 08/790,328, filed on Jan. 28, 1997, now abandoned, which is a continuation of application No. 08/306,073, filed on Sep. 14, 1994, now Pat. No. 5,598,487, which is a continuation of application No. 08/275,096, filed on Jul. 14, 1994, now abandoned, which is a continuation of application No. 07/852,480, filed on Mar. 17, 1992, now abandoned, which is a continuation-in-part of application No. 07/415,169, filed on Sep. 29, 1989, now Pat. No. 5,123,064, and a continuation-in-part of application No. 07/451,322, filed on Dec. 15, 1989, now Pat. No. 5,227,614, which is a continuation-in-part of application No. 07/143,921, filed on Jan. 14, 1998, (Continued)

(51) Int. Cl.
*G06K 9/22* (2006.01)

(52) U.S. Cl. .................................. 382/313; 358/473

(58) Field of Classification Search ................ 382/312, 382/313, 314, 321, 187; 358/473; 178/18.01; 235/472.01; 345/530, 169, 173, 174, 175, 345/159; 705/41
See application file for complete search history.

(56) References Cited

U.S. PATENT DOCUMENTS 3,976,906 A 8/1976 Shattuck (Continued)

FOREIGN PATENT DOCUMENTS

GB 2201125 A 8/1988

(Continued)

OTHER PUBLICATIONS

Jeffrey L. Rodengen, "The Legend of Litton Industries," p. 77, published by Wright Stuff Enterprises, Inc., 2000 (1 page).

*Primary Examiner*—Jingge Wu
*Assistant Examiner*—Seyed Azarian
(74) *Attorney, Agent, or Firm*—McAndrews, Held & Malloy, Ltd.

(57) ABSTRACT

A versatile data handling apparatus providing multiple alternatives for inputting data is disclosed. The apparatus includes an array of depressible keys, a screen-based input system that is located distinctly from the depressible keys, an optical information sensing component and a visual display to present visual information to a user. The data input activities are coordinated by a computerized data handling system communicatively coupled with the various components.

37 Claims, 9 Drawing Sheets

Related U.S. Appliction Data now abandoned, which is a continuation-in-part of application No. 06/897,547, filed on Aug. 15, 1986, now abandoned, application No. 10/085,468, which is a continuation of application No. 09/717,841, filed on Nov. 21, 2000, which is a continuation of application No. 09/189,778, filed on Nov. 10, 1998, now Pat. No. 6,149,062, which is a continuation of application No. 08/438,220, filed on May 9, 1995, now Pat. No. 5,834,753, which is a continuation-in-part of application No. 08/040,313, filed on Mar. 29, 1993, now Pat. No. 5,468,947, which is a continuation-in-part of application No. 07/451,322, filed on Dec. 15, 1989, now Pat. No. 5,227,614, which is a continuation-in-part of application No. 07/143,921, filed on Jan. 14, 1988, now abandoned, said application No. 08/438,220, is a continuation of application No. 08/215,115, filed on Mar. 17, 1994, now abandoned, which is a continuation-in-part of application No. 07/987,574, filed on Dec. 8, 1992, now Pat. No. 5,313,053, which is a continuation of application No. 07/674,756, filed on Mar. 25, 1991, now abandoned, which is a continuation-in-part of application No. PCT/US90/03282, filed on Jun. 7, 1990, application No. 10/085,468, which is a continuation-in-part of application No. 08/478,488, filed on Jun. 7, 1995, which is a continuation of application No. 08/360,014, filed on Dec. 20, 1994, now abandoned, which is a continuation of application No. 07/777,393, filed as application No. PCT/US90/03282 on Jun. 7, 1990, now Pat. No. 5,410,141, and a continuation-in-part of application No. 07/364,902, filed on Jun. 8, 1989, now abandoned, and a continuation-in-part of application No. 07/364,594, filed on Jun. 7, 1989, now abandoned.

U.S. PATENT DOCUMENTS

| Patent No. | | Date | Inventor(s) | |
|---|---|---|---|---|
| 4,005,400 A | | 1/1977 | Engdahl | |
| 4,022,993 A | | 5/1977 | Shattuck | |
| 4,024,368 A | | 5/1977 | Shattuck | |
| 4,158,194 A | | 6/1979 | Mc Waters et al. | |
| 4,277,837 A | | 7/1981 | Stuckert | |
| 4,377,741 A | * | 3/1983 | Brekka et al. | 235/472.01 |
| 4,415,065 A | | 11/1983 | Sandstedt | |
| 4,475,239 A | | 10/1984 | van Raamsdonk | |
| 4,523,297 A | | 6/1985 | Ugon et al. | |
| 4,527,285 A | | 7/1985 | Kekas et al. | |
| 4,621,189 A | | 11/1986 | Kumar et al. | |
| 4,634,845 A | | 1/1987 | Hale et al. | |
| 4,705,211 A | | 11/1987 | Honda et al. | |
| 4,706,096 A | | 11/1987 | Sato | |
| 4,727,245 A | | 2/1988 | Dobbins et al. | |
| 4,752,965 A | | 6/1988 | Dunkley et al. | |
| 4,788,658 A | | 11/1988 | Hanebuth | |
| 4,843,223 A | | 6/1989 | Shino | |
| 4,850,009 A | | 7/1989 | Zook et al. | |
| 4,857,716 A | * | 8/1989 | Gombrich et al. | 235/375 |
| 4,866,646 A | | 9/1989 | Nakamura et al. | |
| 4,870,604 A | | 9/1989 | Tatsuno | |
| 4,890,832 A | | 1/1990 | Komaki | |
| 4,910,775 A | | 3/1990 | Yves et al. | |
| 4,922,111 A | | 5/1990 | Kuwano et al. | |
| 4,942,356 A | | 7/1990 | Ellingen et al. | |
| 4,953,113 A | | 8/1990 | Chadima, Jr. et al. | |
| 4,960,981 A | * | 10/1990 | Benton et al. | 705/41 |
| 4,972,496 A | * | 11/1990 | Sklarew | 382/187 |
| 4,983,818 A | | 1/1991 | Knowles | |
| 5,012,349 A | | 4/1991 | de Fay | |
| 5,012,407 A | | 4/1991 | Finn | |
| 5,047,615 A | | 9/1991 | Fukumoto et al. | |
| 5,049,862 A | | 9/1991 | Dao et al. | |
| 5,050,207 A | | 9/1991 | Hitchcock | |
| 5,059,778 A | | 10/1991 | Zouzoulas et al. | |
| 5,123,064 A | | 6/1992 | Hacker et al. | |
| 5,133,076 A | | 7/1992 | Hawkins et al. | |
| 5,191,197 A | | 3/1993 | Metlitsky et al. | |
| 5,194,852 A | | 3/1993 | More et al. | |
| 5,200,913 A | | 4/1993 | Hawkins et al. | |
| 5,202,817 A | | 4/1993 | Koenck et al. | |
| 5,216,233 A | | 6/1993 | Main et al. | |
| 5,218,187 A | | 6/1993 | Koenck et al. | |
| 5,227,614 A | | 7/1993 | Danielson et al. | |
| 5,305,181 A | | 4/1994 | Schultz | |
| 5,313,053 A | | 5/1994 | Koenck et al. | |
| 5,349,497 A | | 9/1994 | Hanson et al. | |
| 5,410,141 A | | 4/1995 | Koenck et al. | |
| 5,418,684 A | | 5/1995 | Koenck et al. | |
| 5,468,947 A | | 11/1995 | Danielson et al. | |
| 5,468,948 A | | 11/1995 | Koenck et al. | |
| 5,515,303 A | | 5/1996 | Cargin, Jr. et al. | |
| 5,539,193 A | | 7/1996 | Gibbs et al. | |
| 5,587,577 A | | 12/1996 | Schultz | |
| 5,598,487 A | | 1/1997 | Hacker et al. | |
| 5,679,943 A | | 10/1997 | Schultz et al. | |
| 5,763,865 A | | 6/1998 | Swift et al. | |
| 5,834,753 A | | 11/1998 | Danielson et al. | |
| 5,888,087 A | | 3/1999 | Hanson et al. | |
| 5,895,906 A | | 4/1999 | Danielson et al. | |
| 5,914,481 A | | 6/1999 | Danielson et al. | |
| 5,933,526 A | | 8/1999 | Sklarew | |
| 5,970,170 A | * | 10/1999 | Kadashevich et al. | 382/187 |
| 6,149,062 A | | 11/2000 | Danielson et al. | |
| 6,266,685 B1 | | 7/2001 | Danielson et al. | |

FOREIGN PATENT DOCUMENTS

| | | |
|---|---|---|
| JP | 57-105068 | 6/1982 |
| JP | 58-176792 | 10/1983 |

* cited by examiner

DATA CAPTURE APPARATUS WITH HANDWRITTEN DATA RECEIVING COMPONENT

Application Ser. No. 07/415,169, filed Sep. 29, 1989; application Ser. No. 07/451,322, filed Dec. 15, 1989; application Ser. No. 07/143,921, filed Jan. 14, 1988; and application Ser. No. 06/897,547, filed Aug. 15, 1986, are each hereby incorporated herein by reference in its entirety including drawings and appendices.

SPECIFICATION

Authorization Pursuant to 37 C.F.R. 1.71(d)(e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Hand-held data terminals or computers are commercially available for use in a variety of applications, including the distribution and control of products distributed by a route sales person. These hand-held data terminals provide the route sales person with the latest product and customer information as well as information regarding the inventory of the products being distributed. As products are distributed to the customer and other products picked up for return, this information is entered into the terminal together with payment or pricing information. Thus, these hand-held data terminals are useful in many application for order entry, inventory control and route accounting in any industry where a product is being distributed.

Although these hand-held data terminals as a part of a distribution system have greatly increased the accuracy and efficiency of product distribution, there are situations where it is desirable to allow the capture and recording of handwritten data rather than data that is entered by keystrokes. One such use would be to provide for the recording of signatures and for verification of the signatures recorded. In some applications, digitized pads are available to permit the entry of handwritten data, usually in situations where the data is entered by marking a predetermined location on a form that overlies the pad. However, to date there does not appear to be available any means for combining a handwritten data entry module with a portable data terminal in such a way that the handwritten data can be directly entered or read and entered by a scanner.

SUMMARY OF THE INVENTION

The invention provides a means for recording and entering handwritten data in combination with a portable handheld data terminal. The invention provides a module that is removably attachable to a hand-held computer terminal, which module allows the capture of handwritten data. In a preferred embodiment, the module provides a means for capturing handwritten data which is then read by an optical scanner and entered into the system. In the alternative, the module contains a digitized pad which can capture and enter the handwritten data immediately as it is entered on the pad. The preferred module of the invention is easily and quickly attached to a hand-held computer terminal by a hook-hinge arrangement, using the existing connector on the computer terminal and a connector on the module. In the embodiment of the module using a digitized pad, the module and handheld terminal provide an integrated system while allowing normal hand-held portable operation with the module in place.

DESCRIPTION OF THE PREFERRED EMBODIMENTS OF THE INVENTION

Figure 1:
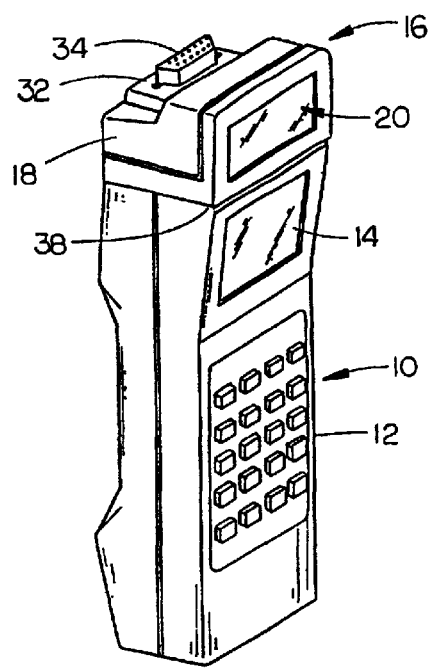
FIG. 1 is a perspective view of a hand-held data terminal with the module of the invention in place.
Figure 2:
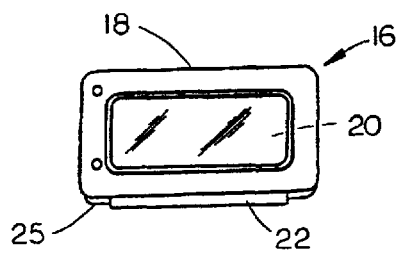
FIG. 2 is a front elevational view of the module.
Figure 3:
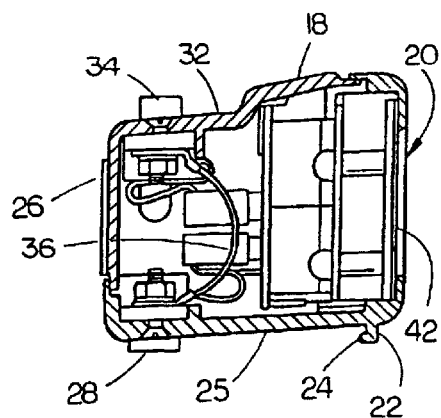
FIG. 3 is a sectional view of the module.
Figure 4:
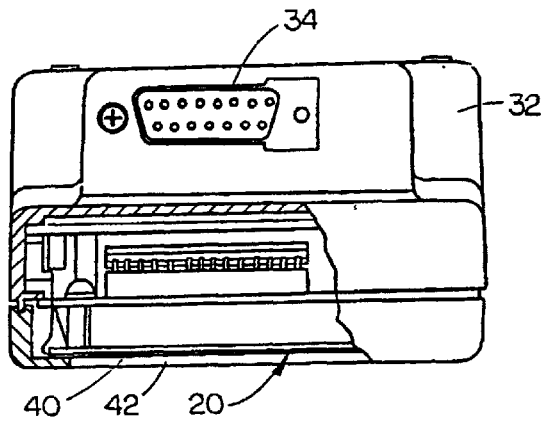
FIG. 4 is a top view of the module, partly in section.
Figure 5:
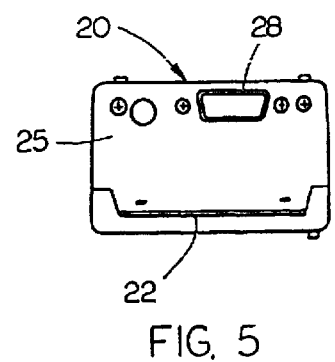
FIG. 5 is a bottom view of the module.

Referring first to FIG. 1 of the drawing, there is illustrated a hand-held data terminal or computer terminal 10 of a type suitable for use with the module of the invention. A computer terminal such as the Model NT141GL hand-held computer terminal of Norand Corporation, Cedar Rapids, Iowa, has the necessary power and flexibility for this application. The computer terminal 10 has a keyboard 12 and a display 14. In addition to keyboard entry, data can be downloaded to the computer terminal 10 from a host computer or entered from a peripheral device such as a scanner.

The module providing for the entry of handwritten data is indicated generally by the reference numeral 16 and is shown in more detail in FIGS. 2 through 5. The module 16 consists of a suitable case 18 that houses a pad 20 for recording data in the manner described hereinafter. The case 18 has formed along the lower edge near the front a depending hinge 22 having a lug 24 extending along its entire length. Also, along the bottom surface 25 of the module 16 near the rear wall 26 is a cable plug 28 that will engage with a standard receptacle (not shown) on the top surface of the hand-held computer terminal 10. Plug 28 and the receptacle provide a standard 15-pin connection between these components. Near the rear of top surface 32 of module 16 there is provided a suitable 15-pin receptacle 34 that provides for connection of other external devices. The receptacle 34 and plug 28 are suitably interconnected by cable 36 inside of the case 18.

The hinge 22 with its locking lug 24 provided for easy, quick and removable connection of the module 16 to the computer terminal 10. By engaging the locking lug 24 under a corresponding shoulder 38 in the top surface of computer terminal 10 and rotating the module 16 rearwardly until the plug 28 on the module 16 engages the receptacle on the computer terminal 10, the module 16 is quickly and solidly affixed to the computer terminal 10 and all necessary connections made between plug 28 and receptacle. As will become more evident from the description hereinafter, the force applied by a user to the module 16 by entering handwritten data on the pad 20 will bias the module 16 further into a locked position on the computer terminal 10. In order to remove the module 16 from the computer terminal 10, the module 16 is grasped and rotated forwardly in the direction opposite to the force that is applied during use. Thus, connection between the module 16 and computer terminal 10 is a solid, positive connection that is quickly and easily made. The pad 20 can be of any suitable type for recording handwritten data. If a suitable optical scanner (not shown) is to be used as a part of the system, the pad 20 can very simply be any suitable means in which handwritten data can be visibly recorded so that it can be scanned and entered into the system by the scanner. Suitable optical scanners are available for reading handwritten data of all types and processing the information read digitally and entering the digitalized data into the computer terminal 10. A suitable optical scanner for this purpose is described in the U.S. patent application Ser. No. 07/238,701, filed Aug. 31, 1988, by Steven E. Koenck, which application has been assigned to Norand Corporation, the same assignee of this application.

The pad 20 also may be a digitized pad of any suitable type containing resistive sheets 40 (FIG. 4) responsive to operating pressures in a suitable range normally applied by a user using a ballpoint pen. The digitized pad 20 using resistive sheets 40 preferably has sufficiently high resolution to provide an accurate representation of handwritten data including signatures. The resistive sheets 40 are preferably covered with an abrasion resistive cover 42 of a suitable polyester material. When the user enters data onto pad 20 by supplying sufficient pressure with a writing instrument to activate the resistive sheets 40, the information is digitized, compressed, stored and processed by the computer terminal 10. For example, if the module 16 is being used for signature verification, a signature written on pad 20 can be immediately verified or stored for future verification.

From the foregoing description, it is evident that the module of the invention provides the capability of capturing and recording handwritten data of all types, which data can be entered either directly using a digitizing pad on the module or the handwritten data can be entered into the data terminal by a suitable optical scanner for further processing. All types of handwritten data, including both texts and graphics, can be captured using the module of the invention in connection with a portable hand-held data terminal. One example that has been described is the verification of signatures, but any handwritten data can be entered directly or scanned into the terminal, the amount of data being limited by the available memory. The module of the invention thus provides a vehicle for significant data entry means not presently available with hand-held type computer terminals.

Description of FIGS. 6 to 10

FIGS. 6 to 10 show a signature pad module with dimensions of 2.870 inches (length), 1.5000 inches (width) and 2.27 inches (height). Accordingly such a module may be adapted to fit in a pocket size shell configuration to form a self contained portable battery operated system. The following description is considered relevant in explaining further the significance of the graphical input capability of the pocket size systems.

While hand-held data terminals have greatly increased the accuracy and efficiency of product distribution, there are situations where it is desirable to allow the capture and recording of handwritten data rather than data that is entered by keystrokes. One such use would be to provide for the recording of signatures and for verification of the signatures recorded. In some applications, digitized pads are available to permit the entry of handwritten data, usually in situations where the data is entered by marking a predetermined location on a form that overlies the pad. However, to date there does not appear to be available any means for combining a handwritten data entry module with a portable data terminal in such a way that the handwritten data can be directly entered or read and entered by a scanner.

Figure 6:
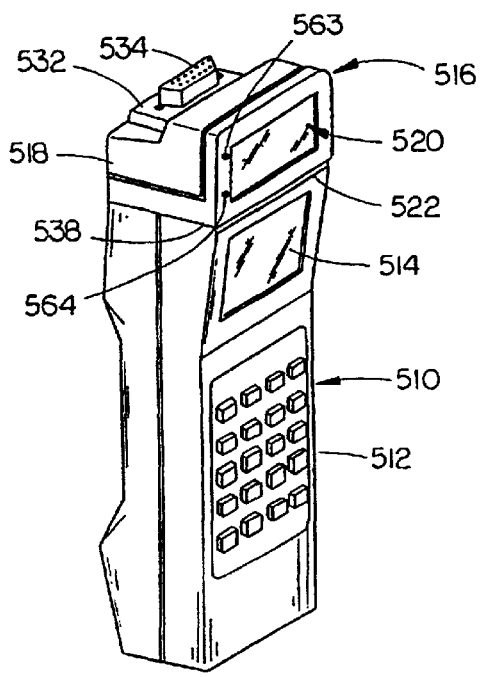
FIG. 6 is a perspective view of another hand-held data terminal with a signature pad module in place.
Figure 7:
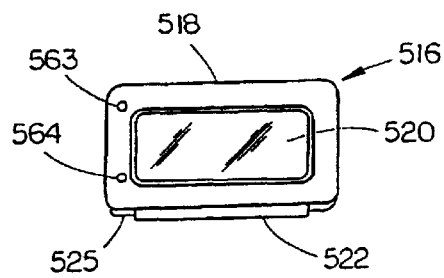
FIG. 7 is a front elevational view of the module.

In an illustrated embodiment, the module contains a digitized pad which can capture and enter the handwritten data immediately as it is entered on the pad. The illustrated module is easily and quickly attached to a hand-held computer terminal by a hook-hinge arrangement, using the existing connector on the computer terminal and a connector on the module. In the embodiment of the module using a digitized pad, the module and hand-held terminal provide an integrated system while allowing normal hand-held portable operation with the module in place. Referring first to FIG. 6 of the drawings, there is illustrated a hand-held data terminal or computer terminal 510 of a type suitable for use with the signature pad module. A computer terminal such as the Model NT141GL hand-held computer terminal of Norand Corporation, Cedar Rapids, Iowa, has the necessary power and flexibility for this application. The computer terminal 510 has a keyboard 512 and a display 514. In addition to keyboard entry, data can be downloaded to the computer terminal 510 from a host computer or entered from a peripheral device such as a scanner.

The module providing for the entry of handwritten data is indicated generally by the reference numeral 516 and is shown in more detail in FIGS. 7 through 10. The module 516 comprises a suitable case 518 that houses a pad 520 for recording data in the manner described hereinafter. The case 518 has formed along the lower edge near the front a depending hinge 522 having a lug 524 extending along its entire length. Also, along the bottom surface 525 of the module 516 near the rear wall 526 is a cable plug 528 that will engage a standard receptacle (not shown) the top surface of the hand-held computer terminal 510. Plug 528 and the receptacle provide a standard 15-pin connection between these components. Near the top surface 532 of module 516 there is provided a suitable 15-pin receptacle 534 that provides for connection of other external devices. The receptacle 534 and plug 528 are suitably interconnected by means including ground cable 536 inside of the case 518.

The hinge 522 with its locking lug 524 provides for easy, quick and removable connection of the module 516 to the computer terminal 510. By engaging the locking lug 524 under a corresponding shoulder at 538 in the top surface of computer terminal 510 and rotating the module 516 rearwardly until the plug 528 on the module 516 engages the receptacle on the computer terminal 510, the module 516 is quickly and solidly affixed to the computer terminal 510 and all necessary connections made between plug 528 and its mating receptacle. The force applied by a user to the module 516 in entering handwritten data on the pad 520 will bias the module further into a locked position on the computer terminal 510. In order to remove the module 516 from the computer terminal 510, the module 516 is grasped and rotated forwardly in the direction opposite to the force that is applied during use. Thus, connection between the module 516 and computer terminal 510 is a solid, positive connection that is quickly and easily made.

The pad 520 can be of any suitable type for recording handwritten data. If a suitable optical scanner (not shown) is to be used as a part of the system, the pad 520 can very simply be any suitable means in which handwritten data can be visibly recorded so that it can be scanned and entered into the system by the scanner. Suitable optical scanners are available for reading handwritten data of all types and processing the information read digitally and entering the digitized data into the computer terminal 510. A suitable optical scanner for this purpose is described in the U.S. patent application Ser. No. 07/238,701, filed Aug. 31, 1988, by Steven E. Koenck, which application has been assigned to Norand Corporation, the same assignee of this application.

The pad 520 also may be a digitizer pad of a any suitable type containing resistive sheets forming a digitizer means 540 (FIG. 9) responsive to operating pressures in a suitable range normally applied by a user using a ballpoint pen. The digitized pad 520 using resistive sheets at 540 preferably has sufficiently high resolution to provide an accurate representation of handwritten data including signatures. The resistive sheets at 540 are preferably covered with an abrasion resistant cover 542 of a suitable polyester material. When the user enters data onto pad 520 by supplying sufficient pressure with a writing instrument to activate the resistive sheets at 540, the information is digitized, compressed and stored and/or transmitted to the computer terminal 510. For example, if the module 516 is being used for signature verification, a signature written on pad 520 can be immediately verified or stored for future verification.

From the foregoing description, it is evident that the data capture module provides the capability of capturing and recording handwritten data of all types, which data can be entered either directly using a digitizing pad on the module, or the handwritten data can be entered into the data terminal by a suitable optical scanner for further processing. All types of handwritten data, including both text and graphics, can be captured using the module in connection with a portable hand-held data terminal. One example that has been described is the verification of signatures, but any handwritten data can be entered directly or scanned into the terminal, the amount of data being limited by the available memory. The module thus provides a vehicle for significant data entry means not presently available with hand-held type computer terminals.

The actual volume occupied by the signature pad 520 and the printed circuit boards 562 and 570 is about 1¼ inch (wide) by 3¼ inch (long) by about 1⅜ inch (deep). This is consistent with use with a pocket-size receiving module.

The pad active area may be 2.375 inches by 0.875 inch by 0.055 inch. The covering 542 may be 0.007 inch polyester. The pad may utilize a silicone elastomer pad sensor, and may provide a pad resolution of 175 points per inch giving a resolution of 415 points across and at least 150 points in height.

Generally the signature pad may comprise upper and lower resistive sheets of silicone elastomer which have resistive ink applied to the confronting faces so as to present uniform resistivity over the surfaces. Application of point pressure to the cover sheet 542 causes the resistive layers to contact at a corresponding point.

For tractor fed forms, alignment pegs 563, 564 on the bezel part 518B are used to engage in the form feed holes to hold the form in position during the signature capture process. Should the sensor pad 520 be damaged, the bezel part 518B including the sensor pad can be replaced without replacing the entire unit. This is accomplished by removing screws 553, 554 and pivoting parts 518A, 518B away from each other. The connector 560 can then be unplugged from the input/output printed circuit board 562. The ground cable 536 may be separable at 568.

Figure 9:
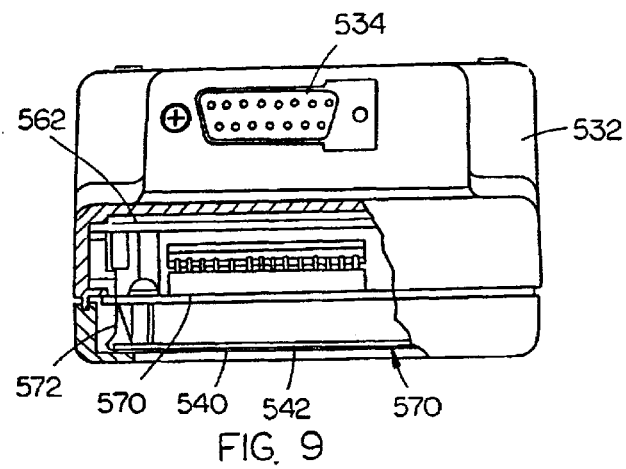
FIG. 9 is a top view of the module, partly in section.
Figure 10:
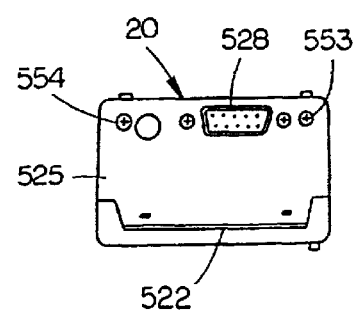
FIG. 10 is a bottom view of the module.

Printed circuit board 570 may carry components such as a CPU chip (e.g. type 80C31), CMOS static RAM (e.g. 32K×8), and an EPROM component (e.g. type 27C256) as indicated at 571, FIG. 9.

The printed circuit boards 562 and 570 are 1⅜ inch by 3 inch by less than 1/16 inch and are separated from each other by about one-half inch. Coupling between the digitizer pad 540 and the circuitry of board 562 may be by means of two twin conductor ribbons such as that indicated at 572, FIG. 9.

Figure 8:
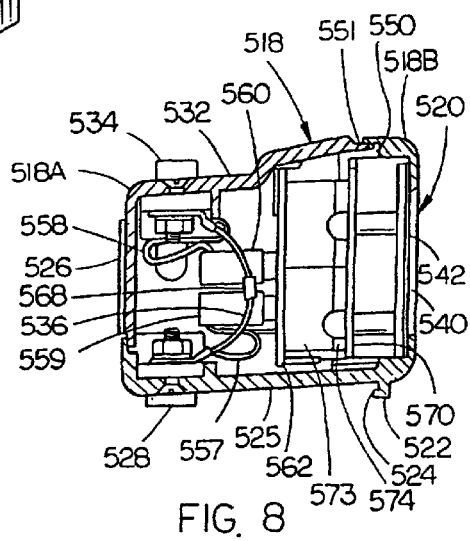
FIG. 8 is a sectional view of the module.

Referring to FIG. 8, it can be seen that case 518 is formed of a base assembly 518A and a bezel assembly 518B. The base assembly includes an outwardly facing hook plate 550 which interlocks with a receiving recess of the bezel assembly. The parts 518A, 518B are pivotal at the hook plate-recess into a snug interfitting relationship, with edge 551 fitting into a receiving channel of part 518B. The parts are then secured together by means of screws 553, 554, FIG. 23. The channel may have a sealing strip seated therein, e.g. a 0.052 inch diameter elastomer 12.5 inches long.

Ribbon connectors 557, 558 from the 15-pin plug 528 and 15-pin receptacle 534 are provided with internal 16 position receptacles 559, 560 which connect with headers on the input/output printed circuit board 562. When the pad is disabled, communications will pass between connectors 528 and 534 unmodified.

By way of an alternate example, the resistive sheets may be of Mylar of five mils (0.005 inch) thickness. In any case, conductive x-axis conductive strips may extend along the long edges of the upper resistive layer, and Y-axis conductive strips may extend along the short edges of the lower resistive layer, the pairs of conductive strips being connected with conductors of respective ribbons such as 572, FIG. 9.

Conveniently the outer sheet is somewhat longer in the length and width dimensions so as to overlie a metal frame 573, FIG. 9, while the inner sheet is seated in a recess within the confines of the frame 573. The outer resistive sheet is then fastened at its margins to the frame so that there is normally a clearance air space of approximately ten to thirty mils (one mil equals 0.001 inch) between the two resistive layers. The confronting resistive surfaces may comprise graphite ink resistive surfaces as is well understood in the art.

Figure 11:
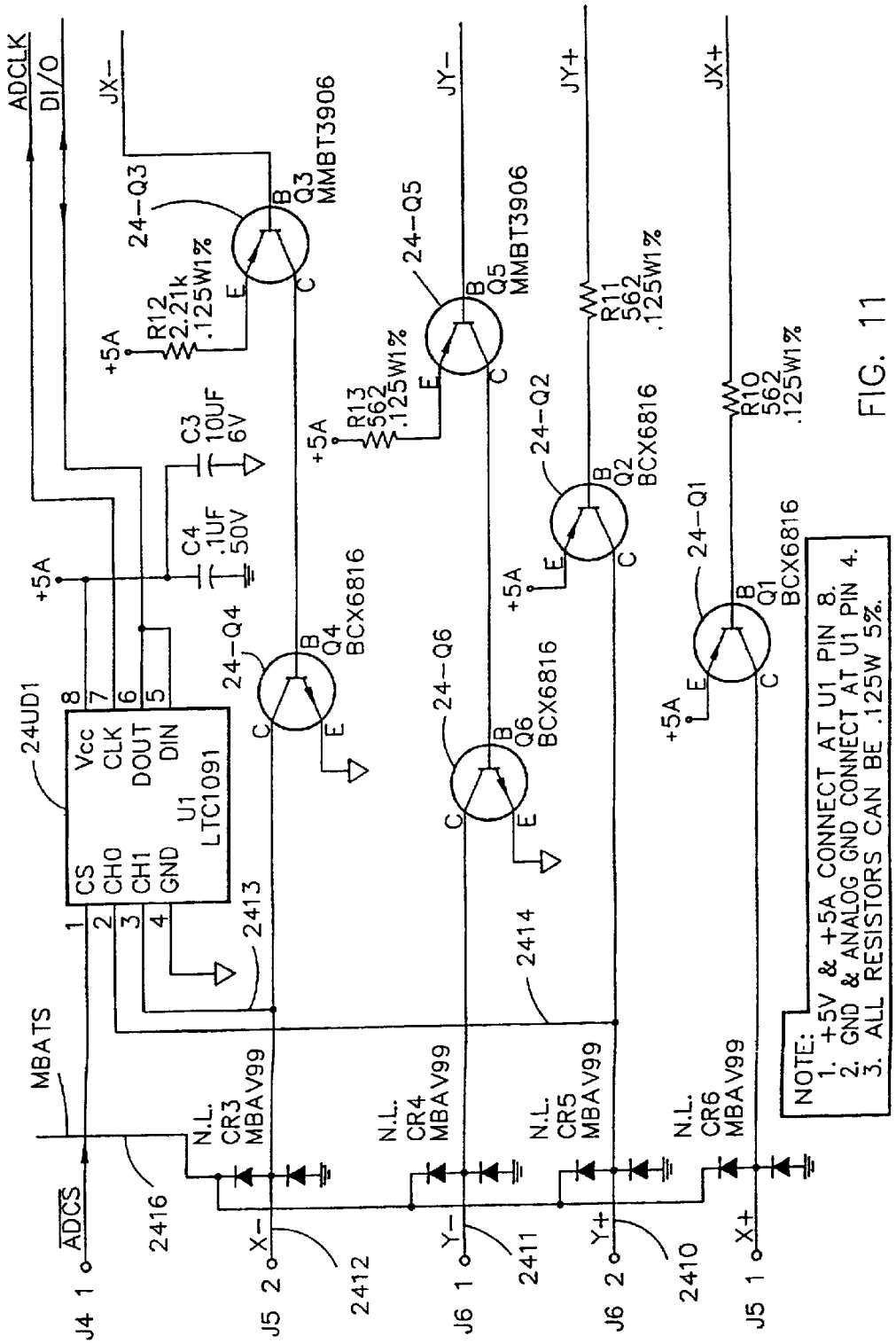
FIGS. 11 and 12 show exemplary circuitry for the input/output printed circuit board of the embodiment of FIGS. 6–10.
Figure 12:
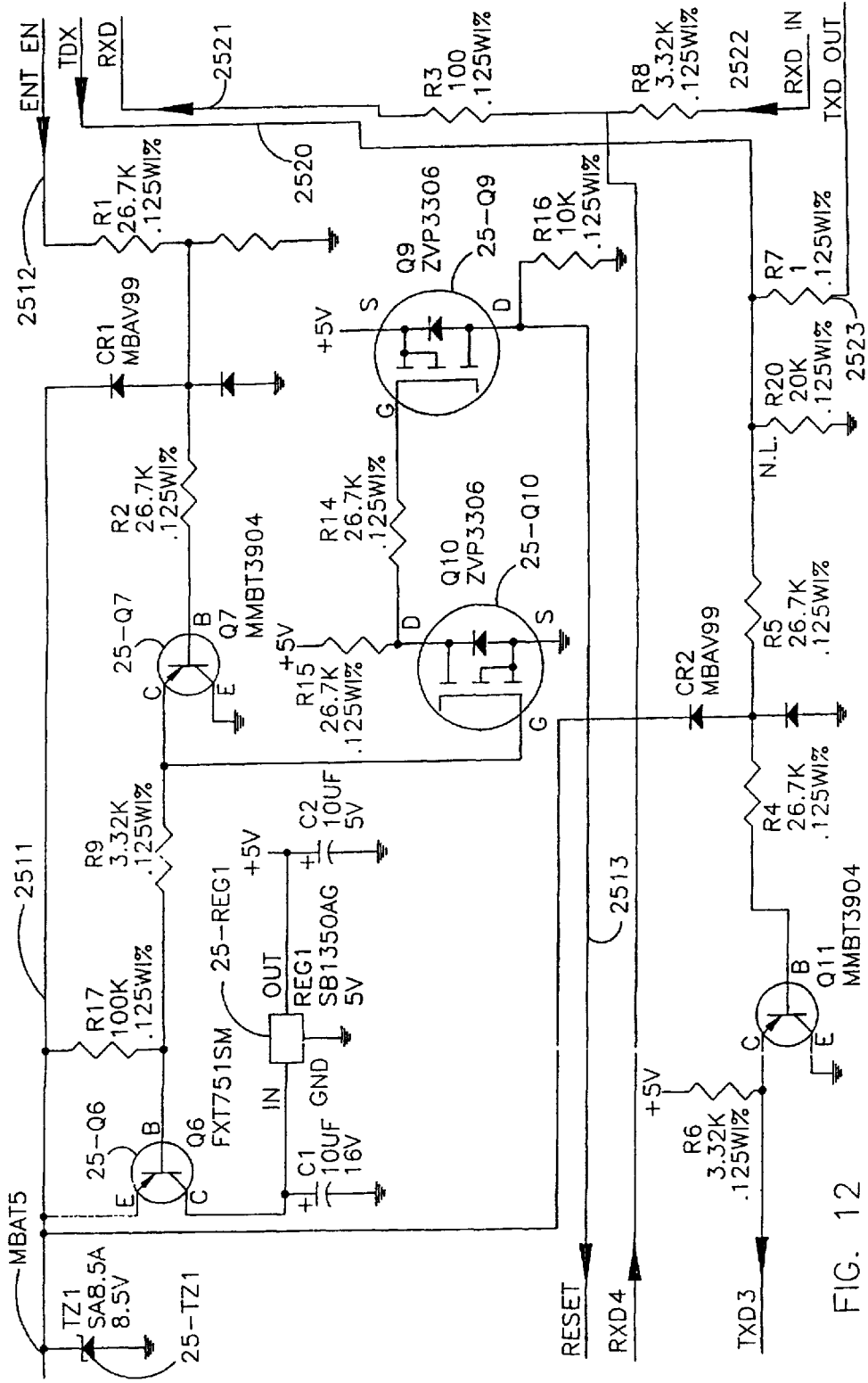
Figure 13:
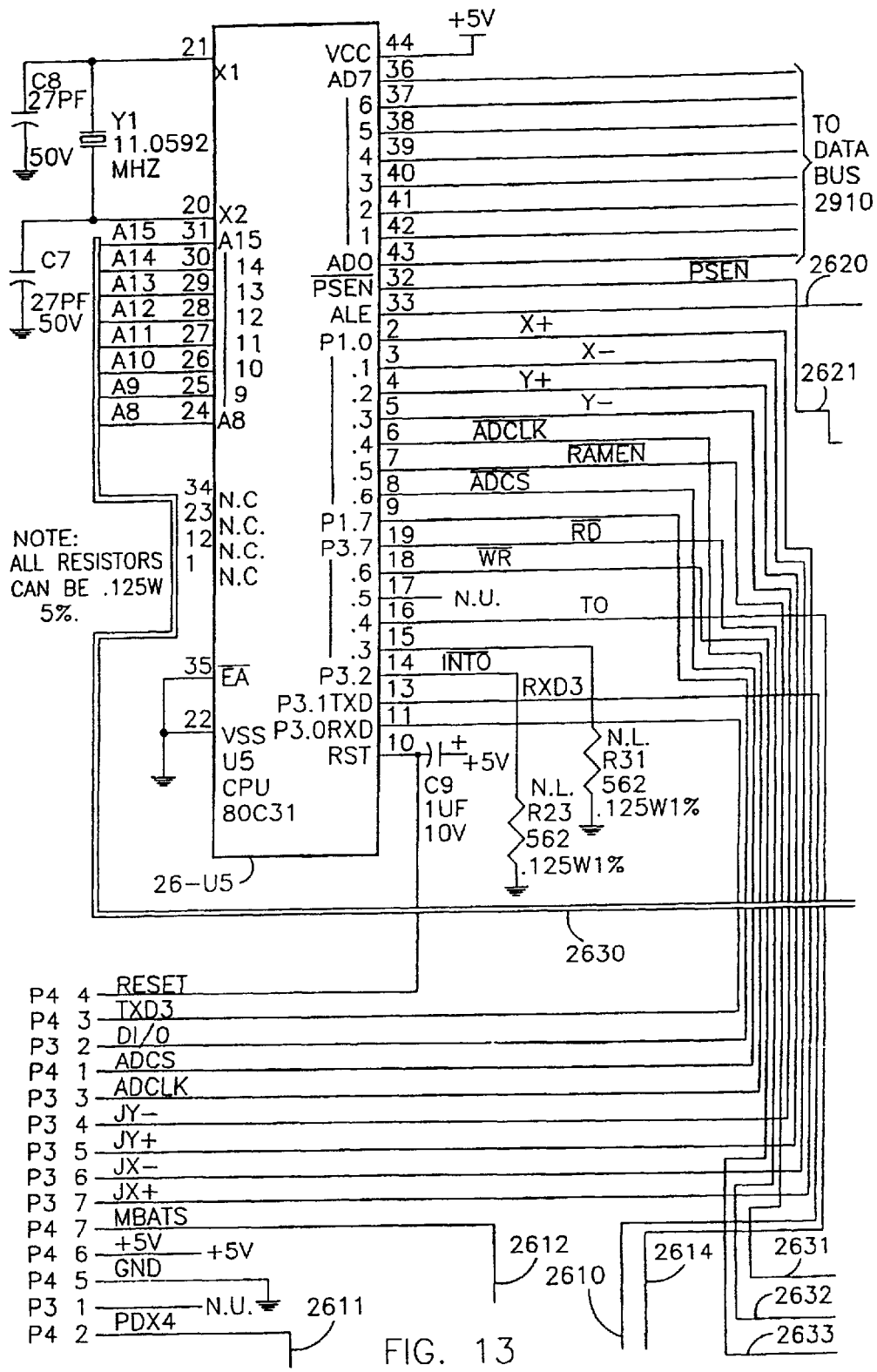
FIGS. 13–16 show exemplary circuitry for the CPU printed circuit board of the embodiment of FIGS. 6–10.

Description of FIGS. 11 and 12

FIGS. 11 and 12 illustrate exemplary circuitry for the input/output printed circuit board 562. FIG. 11 shows the circuitry connected to the X and Y axis conductive strips of the signature pad 520. For reading an X-axis dimension from the signature pad, transistors 24-Q2, 24-Q5 and 24-Q6 are turned on to apply a potential of five volts analog, (+5A), through transistor 24-Q2 to the Y+ conductor 2410 which leads to the Y axis strip at one end of the inner resistive surface. The return path from the other end of the inner resistive strip is via Y-conductor 2411 and transistor 24-Q6, creating a potential distribution along the long X-axis dimension of the pad. The X-axis potential value at the point contacting the outer resistive sheet is coupled via conductors 2412 and 2413 to the channel one input of analog to digital converter 24-U1 (e.g. type LTC1091).

Similarly, to read out a Y-axis value, transistors 24-Q3, 24-Q4 and 24-Q1 are turned on, and the Y-axis potential at the contact point is read out via the inner resistive sheet and conductors 2410 and 2414 leading to the channel zero input of the analog to digital converter 24-U1.

In FIG. 12, line 2511 receives battery voltage MBATS from the terminal 10. Line 2511 is coupled with pin 15 of connector 528, via position 15 of receptacle 559, FIG. 21. The I/O printed circuit board 562 connects position 15 of the header receiving receptacle 559 with position 15 of the header for receptacle 560. Line 2511 connects with line 2416, FIG. 11, and connects to the CPU printed circuit board 570 via mating interboard connectors such as 573, 574, FIG. 8, a capacitor (not shown, 0.01 microfarad, 50 volts), being connected between MBATS and ground in parallel with 25-TZ1.

Applying EXT EN to conductor 2512 serves to transmit a reset signal to the processor of board 570 via 25-Q7, 25-Q10, 25-Q9 and 2513 (RESET).

The signals associated with the various positions of connectors 528 and 534 are as follows:

| Connector 528 | | | Connector 534 | | |
|---|---|---|---|---|---|
| J1 | 1 | TXD | J2 | 1 | TXD Out |
| J1 | 2 | DTR | J2 | 2 | DTR |
| J1 | 3 | RTS | J2 | 3 | RTS |
| J1 | 4 | RCT | J2 | 4 | RCT |
| J1 | 5 | RXD | J2 | 5 | RXD IN |
| J1 | 6 | CTS | J2 | 6 | CTS |
| J1 | 7 | DSR | J2 | 7 | DSR |
| J1 | 8 | CHG In | J2 | 8 | CHG In |
| J1 | 9 | GND | J2 | 9 | GND |
| J1 | 10 | XOVER/TXL | J2 | 10 | XOVER/TXL |
| J1 | 11 | PROX/RXC | J2 | 11 | PROX/RXC |
| J1 | 12 | SCAN/PWR | J2 | 12 | SCAN/PWR |
| J1 | 13 | EXT EN | J2 | 13 | N.U. |
| J1 | 14 | RCR/CD | J2 | 14 | RCR/CD |
| J1 | 15 | MBATS | J2 | 15 | MBATS |
| J1 | 16 | N.U. | J2 | 16 | N.U. |

The symbols J1 and J2 actually refer to the headers on I/O board 562 receiving connectors 559 and 560, respectively. Thus position 16 is not used. Position 13 of J1 connects with line 2512, position 1 connects with line 2520 and position 5 connects with line 2521. Line 2522 connects with position 5 of J2, and line 2523 connects with position 1 of J2. The printed circuit board 562 provides direct connections between positions of J1 and J2 designated DTR, RTS, RCT, CTS, DSR, RCR/CD, RCT, CHG IN, XOVER/TXL, and PROX/RSC, MBATS and GND.

The transistor 25-Q6 controls supply of power to the pad regulator 25-REG1.

The interboard connectors on board 562 such as 573, FIG. 8, are designated J3 and J4 carry the following signals.

| J3 | 1 | N.U. | J4 | 1 | ADCS |
|---|---|---|---|---|---|
| J3 | 2 | DI/O | J4 | 2 | RDX4 |
| J3 | 3 | ADCLK | J4 | 3 | TXD3 |
| J3 | 4 | JY− | J4 | 4 | RESET |
| J3 | 5 | JY+ | J4 | 5 | GND |
| J3 | 6 | JX− | J4 | 6 | +5 V |
| J3 | 7 | JX+ | J4 | 7 | MBATS |

Description of FIGS. 13, 14, 15 and 16

FIGS. 13–16 show exemplary circuitry for the CPU board 570. The interboard connectors on board 570 such as connector 574 are designated P3 and P4 and connect with the CPU, 26-U5, of board 570 as indicated in the following table:

| CPU (Type 80C31) | | | | |
|---|---|---|---|---|
| | | | Pin | CPU Pin Designation |
| P3 | 1 | N.U. | | |
| P3 | 2 | DI/9 | 9 | P 1.7 |
| P3 | 3 | ADCLK | 6 | P 1.4 |
| P3 | 4 | JY− | 5 | P 1.3 |
| P3 | 5 | JY+ | 4 | P 1.2 |
| P3 | 6 | JX− | 3 | P 1.1 |
| P3 | 7 | JX+ | 2 | P 1.0 |
| P4 | 1 | $\overline{\text{ADCS}}$ | 8 | P 1.6 |
| P4 | 3 | TXD3 | 11 | RXD |
| P4 | 4 | RESET | 10 | RST |
| P4 | 5 | GND | 22,35 | VSS,EA |
| PR | 6 | +5 V | 44 | VCC |

Figures 14, 15:
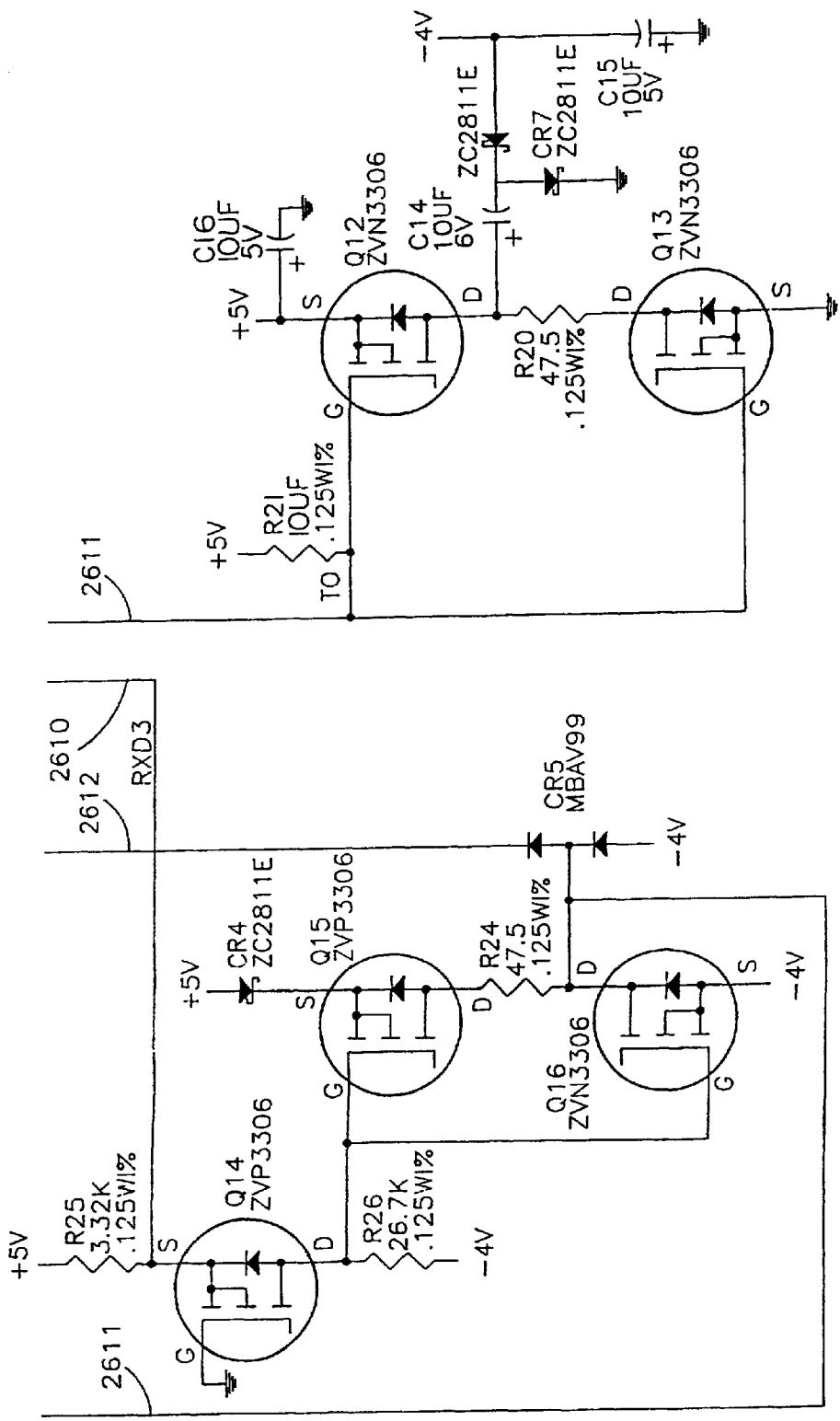

Pin 13 (TXD) of CPU 26-U5 connects via line 2610 (RXD3) with the circuit of FIG. 14, which in turn drives line 2611 (RXD4). MBATS line 2612 also connects with FIG. 14. Line 2614 connects with the circuit of FIG. 15.

Figure 16A:
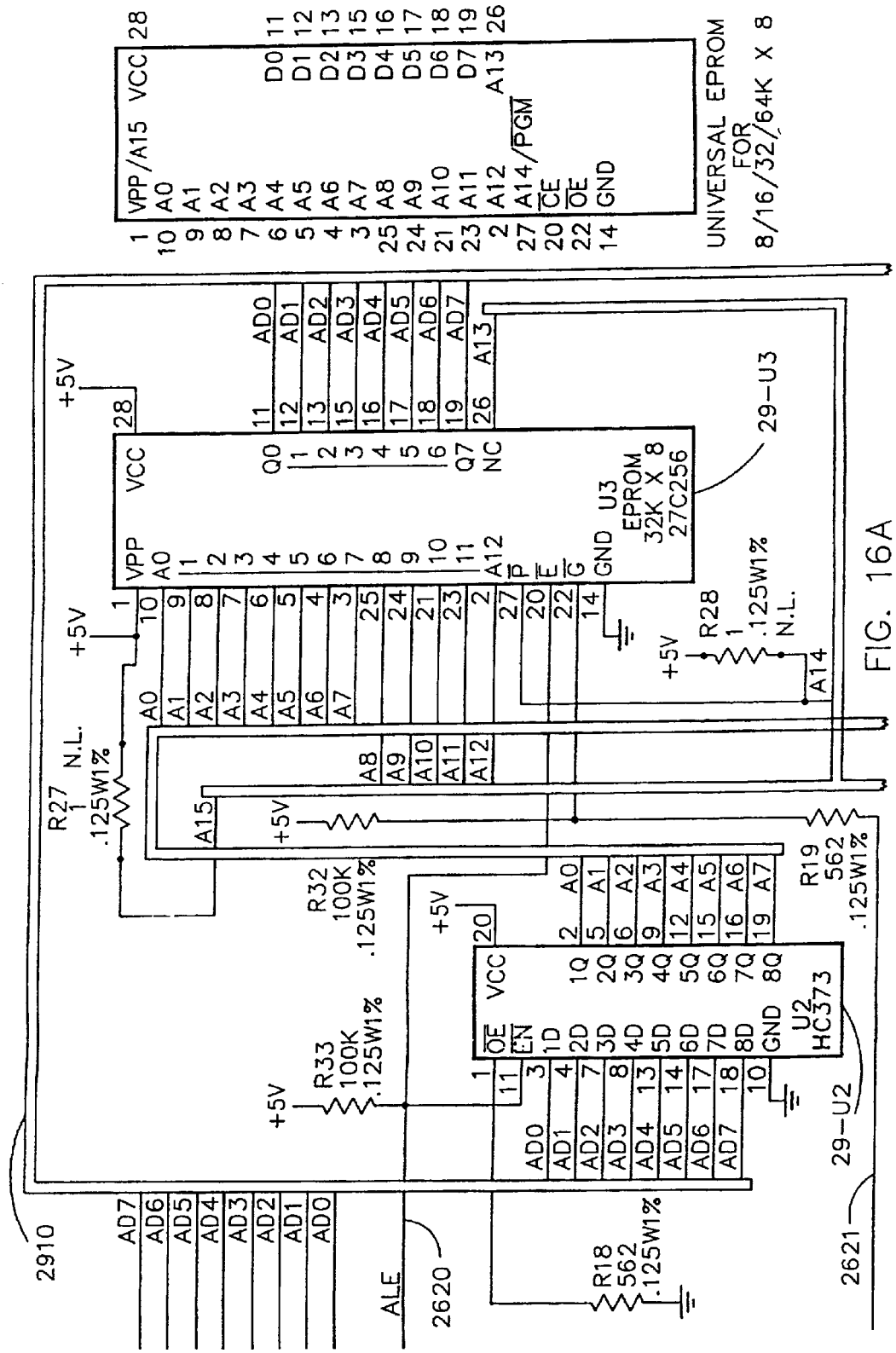
Figure 16B:
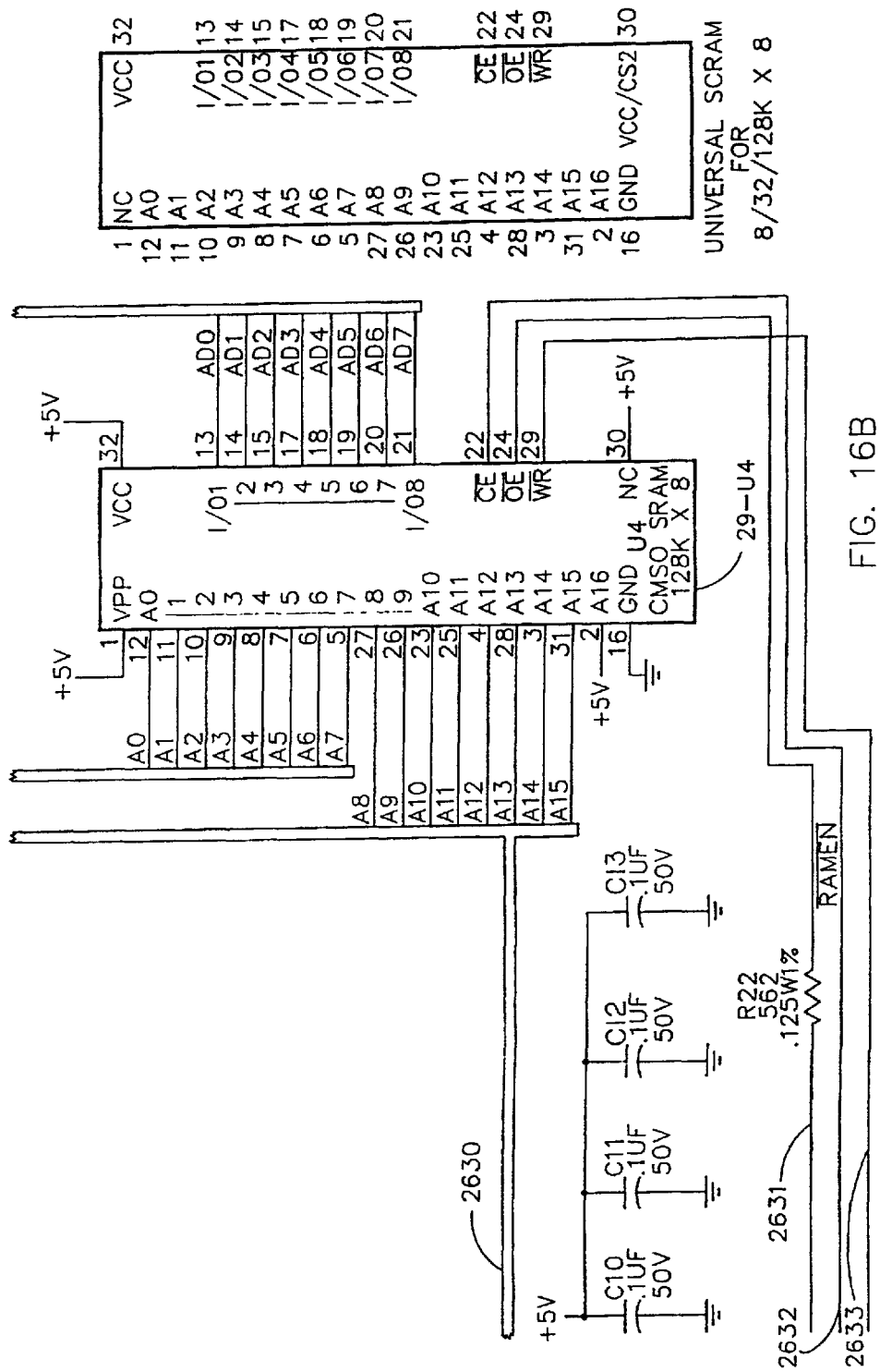

Pins of CPU 26-U5 designated AD7-AD0, respectively connect with data bus 2910, FIG. 16. The pin of 26-U5 designated ALE connects with latch 29-U2 and EPROM 29-U3 via line 2620. Pin 32 of 26-U5 ($\overline{\text{PSEN}}$) connects via line 2621 with 29-U3. Address bus 2630 from pins designated A8–A15 of 26-U5 connects with components 29-U3 and 29-U4 (a CMOS static random access memory, e.g., 128K×8).

Pin $\overline{\text{RD}}$ of CPU 26-U5 connects via line 2631, pin $\overline{\text{RAMEN}}$ connects via line 2632; and pin $\overline{\text{WR}}$ connects via line 2633, with 29-U4.

EXAMPLE VII

As an example pursuant to FIGS. 6–16, a signature pad may have the configuration for interfitting in a receptacle. The printed circuit boards 562 and 570 could be consolidated into a single printed circuit board underlying the signature pad and having comparable dimensions, e.g. about two inches by three inches. The inputs and outputs from the consolidated circuit board could comprise MBATS, GND, EXT EN, and the communication lines for two-way alternate point-to-point communication. These inputs and outputs could couple with a module at a region using mating surface contacts.

Battery power could be available in the receiving module, and protocol conversion and other functions of the terminal could be performed by a modular processor. A touch screen could be included at the three margins of the signature pad at the top surfaces of the module.

By way of example, signatures as digitized by means of the signature pad module could be transferred under the control of a processor module to a data storage card inserted in a slot. Alignment pegs such as 563, 564, FIG. 7, could form part of the signature pad module, such that a touch screen would be accessible to activate the signature pad module by transmitting EXT EN to the pad module in response to actuation of a region of the touch screen in signature capture mode.

Such touch screen would then signal when a signature had been properly digitized and stored. The touch screen associated with the module can accommodate the entire data capture command set.

Figure 17:
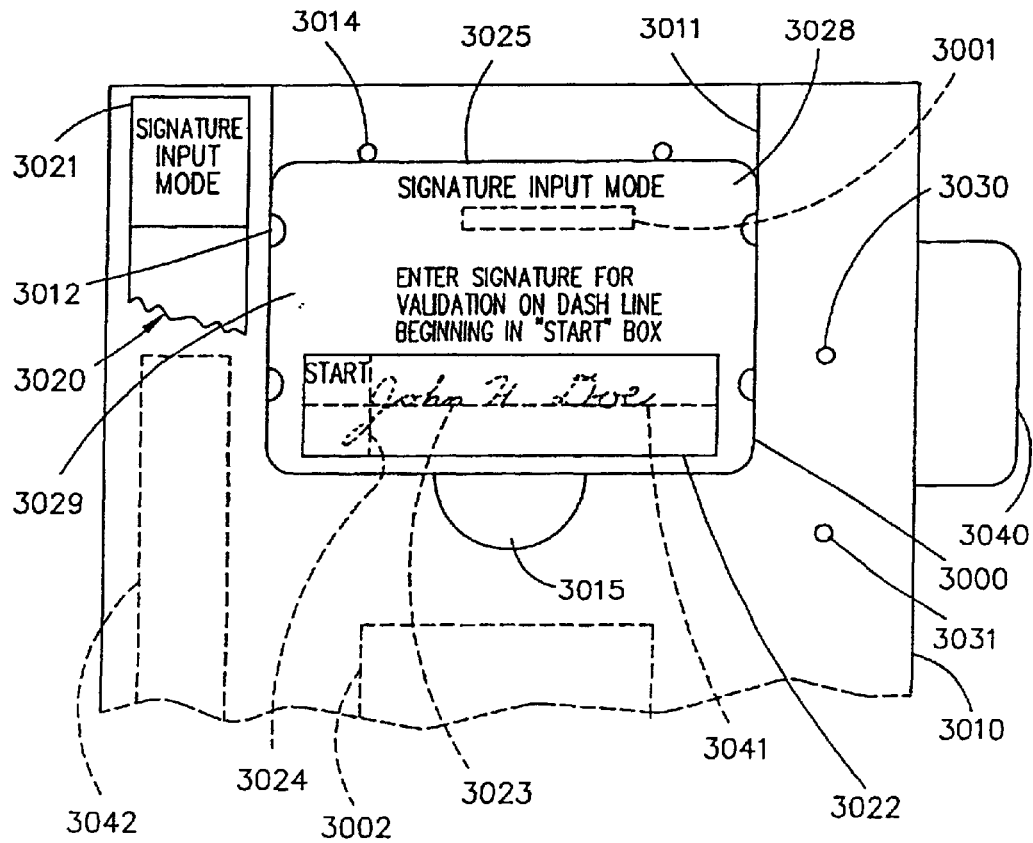
FIG. 17 is a partial plan view showing a computerized processor module assembled in a receiving module and operating in signature input mode.
Figure 18:
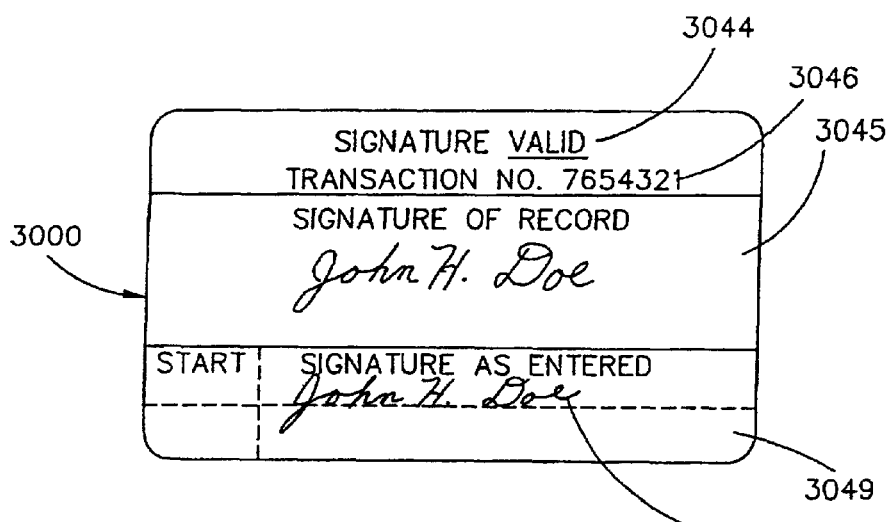
FIG. 18 shows the computerized processor module displaying the results of a signature verification operation for the case where the processor module functions as a separate self-contained unit using its own battery power.

EXAMPLE VIII (FIGS. 17 and 18)

In Example VIII, the circuitry of FIGS. 11–16 may be part of a computerized processing module 3000, FIG. 17. A receiving module 3010 may receive the module 3000 and may have coupling means for engagement with cooperating connection means 3001 of module 3000.

In this Example VIII, the receiving module 3010 may perform the functions of data entry terminal 510, FIG. 6, and may provide battery means 3002 capable of providing for battery operation of the circuitry of FIGS. 11–16. In particular, receiving module 3010 would have coupling means for automatically engaging with the connection means 3001 as module 3000 is inserted into a receptacle 3011 of module 3010. The coupling means and connection means 3001 could also provide automatically completed signal communication paths such as provided by the terminal connector automatically mating with connector 528, FIG. 10, during assembly of parts 510 and 516, FIG. 6. The module 3010 may have ledges such as 3012 for overlying the side edges of the module 3000, and may include segmental spherical detents such as 3014 which are spring urged into receptacle 3011 to retain the module 3000 therein. A notch 3015 may facilitate removal of the complete module 3000 as a unit from the receptacle 3011.

The module 3010 may have a touch screen 3020. One of the touch switch positions may be "Signature Input Mode" as indicated at 3021. When this mode is selected by manually depressing region 3021, a graphic display is produced on module 3000 as indicated in FIG. 17 which facilitates the handwritten entry of a signature e.g. in a space indicated by a box displayed at 3022 with a signature line at 3023, and a "start" box indicated by a dash line 3024.

Module 3000 may include a digitizer input screen 3025 over substantially its entire length and width as viewed in FIG. 17, and a graphic display e.g. of the dot matrix type may underlie the digitizer screen and have a resolution sufficient to accurately display handwritten data such as signatures and the like, as well as indicia such as 3022, 3023, and 3024.

Where the signature is to be entered directly on the digitizer screen 3025, a wooden stylus is conveniently used. In this event, the display means of module 3000 may display the mode at 3028 and suitable instructions at 3029.

Where a form with feed holes is to be engaged with pegs 3030, 3031 on module 3010, the form may have printed thereon indicia such as 3022, 3023, 3024, "start", and 3029. In this case, a conventional ball point pen may be used to enter the signature on the form, and to apply a corresponding impression to the digitizer input screen 3025 of FIG. 17.

By way of example, the computerized processing module 3000, or a data storage card such as indicated at 3040 (inserted into a slot) may store the authorized signatures of persons empowered to approve a given transaction. Thus, a person delivering goods to various establishments may download authorized signatures for a given delivery into the module 3000 just prior to making the delivery, or may select a respective data storage card 3040 from a file thereof.

After the signature impression such as 3041 has been entered in space 3022 of the digitizer input screen, the processor of module 3000 or a processor 3042 of module 3010 may carry out a comparison of the signature impression 3041 with the stored authorized signatures. If there is a sufficient match with an authorized signature the graphical display may indicate that the signature was a valid authorized signature as at 3044, FIG. 18. The matching authorized signature of record may be displayed in space 3045, FIG. 18, or the name represented by the signature may be simply printed in space 3045. A transaction number may be assigned as indicated at 3046. Further, the signature 3047 corresponding to impression 3041, as stored by module 3000, module 3010 or storage card 3040 may be displayed at a region 3049 adjacent region 3045 so that the operator can confirm the matching condition, or actually make the decision as to whether the signature is to be accepted. Of course, the signature as entered may be stored in fully digitized form or in a suitably compacted form in module 3000, module 3010 or storage card 3049.

DESCRIPTION OF EXAMPLE IX

Example VIII could be applied to the embodiment of FIGS. 6–16 as a further example, in which case the resistive typed digitizer screen 520 could be used for the direct entry of a signature e.g. using a passive wooden stylus, and display 514 could provide a resultant display such as indicated in FIG. 18, and could display indicia such as 3028 and 3029, prior to entry of the signature impression 3041. The signature comparison program, and the set of authorized signatures could then be downloaded into the data terminal 510, e.g. via connectors 534 and 528 from a data storage system within a delivery vehicle or the like. Reference may be made to U.S. Pat. No. 4,798,919 which teaches using the sensing of pressure applied across the signature as a further parameter for use in signature verification.

SUMMARY RE EXAMPLES VIII And IX

In examples VIII and IX, computerized processing module 3000 provides for the computerized processing and storage of data as described in detail in reference to FIGS. 6–16. The stored data e.g. complete digitized information concerning a signature impression 3041 may be transmitted from random access storage such as indicated at 29-U4 via connection means 3001 to an external receiving module such as 3010 or 510, FIG. 6. The computerized processing module 3000 could be of size to fit in a shirt pocket as with module 516, FIG. 6, e.g. a cross sectional perimeter of not more than about eight inches and a length dimension of not more than about five inches.

The connection means 3001 of module 3000 automatically engages with the coupling means in receptacle 3011 as the module 3000 is inserted over detents 3014 and under ledges 3012 to assemble the module 3000 with the receiving module 3010. Correspondingly, the connection means 3001 is automatically disengaged from the coupling means as the module 3000 is removed as a unit from receptacle 3011 (e.g. with the use of one finger inserted into notch 3015).

The digitizer input screen 3025 is transparent so that the matrix type display there beneath is visible to the user through the digitizer screen. Any of the digitizer technologies currently available such as those referred to herein may be utilized. Both the digitizer input and the graphical display of module 3000 have a resolution to accurately record and display handwritten characters such as represented by signatures 3041, 3045 and 3047. The data such as signatures stored in module 3000 in complete digitized form or in compacted form may be transmitted to the coupling means of receiving module 3010 for utilization externally of module 3000. For example, receiving module 3010 may have a programmed processor at 3042 for comparing a signature impression data relating to a signature impression 3041 with a set of authorized signatures stored on a data storage card 3040.

The display of module 3000 may display indicia such as 3022, 3023, and 3024 for facilitating input of a signature impression such as 3041 directly on the digitizer input screen 3025, or a form may be located e.g. by pegs 3030, 3031 and itself have indicia printed thereon. In Example IX, a conventional display screen at 514, FIG. 6, of a receiving module 510, may display instructions adjacent a digitizer screen at 520, and may provide a display such as indicated in FIG. 18, once a signature impression at 520 has been compared with a set of authorized signatures stored by the receiving module 510, FIG. 6.

Although the invention has been described in connection with certain preferred embodiments thereof, it would be evident to those skilled in the art that various revisions and modifications to the preferred embodiment, as well as additional applications to those described by way of example herein can be made without departing from the spirit and scope of the invention. It is our intention however that all such revisions and modifications that may be obvious to those skilled in the art will be included within the scope of the following claims.

Incorporation by Reference

The present application hereby incorporates by reference the following U.S. patents in their entirety including drawings and appendices and incorporated material: U.S. Pat. Nos. 4,877,949, 5,019,699, 5,227,614, 5,410,141, 5,468,947, and 5,834,753.

We claim:

1. A hand-held data handling device, comprising:
    a housing;
    a keyboard, located on a user accessible surface of said housing, comprising a plurality of individual, user-depressible keys;
    a screen input component, located on a user accessible surface of said housing, said screen input component located distinctly from said keyboard;
    a visual display, located at least partially at the same location occupied by said screen input component, said visual display being capable of presenting visual information to a user;
    an optical information sensing component, housed by said housing; capable of sensing light energy reflected from an optical indicia; and
    a computerized data handling system, located internally of said housing, coupled with said keyboard and said screen input component;
    wherein said housing is of a shape and size permitting the data handling device to be hand-held and portable such that data can be input while said housing is held in a user's hand.

2. The hand-held data handling device of claim 1, wherein said optical information sensing component comprises an optical indicia reader.

3. The hand-held data handling device of claim 2, wherein said optical indicia reader comprises a bar code scanner.

4. The hand-held data handling device of claim 1, wherein said optical information sensing component comprises an optical communication component.

5. The hand-held data handling device of claim 4, wherein said optical communication component is capable of wireless communication with a computerized device.

6. The hand-held data handling device of claim 4, wherein said optical communication component is positioned so as to communicatively couple with a docking device when docked therewith.

7. The hand-held data handling device of claim 1, further comprising a wire communication component enabling the hand-held data handling device to communicate via a wired connection.

8. The hand-held data handling device of claim 7, wherein said wire communication component enables the hand-held data handling device to communicate via a wire-linked telephonic communication system.

9. The hand-held data handling device of claim 1, wherein said housing is of a shape and size permitting the hand-held data handling device to be gripped in one band during data entry via said screen input component.

10. The hand-held data handling device of claim 1, wherein said housing is of a shape and size permitting the hand-held data handling device to be gripped in one hand during data entry via said keyboard.

11. The hand-held data handling device of claim 1, wherein said housing is of a shape and size permitting the hand-held data handling device to be gripped in one hand during use of said optical information sensing component.

12. The hand-held data handling device of claim 1, further comprising an information storage card.

13. The hand-held data handling device of claim 12, wherein said information storage card is a user-removable information storage card.

14. The hand-held data handling device of claim 1, wherein said screen input component comprises a touch screen.

15. The hand-held data handling device of claim 1, wherein said keyboard is located adjacent to said screen input component.

16. The hand-held data handling device of claim 1, wherein said optical information sensing component is structured to function both as a wireless communication component and as an optical indicia reader.

17. The hand-held data handling device of claim 16, further comprising a user-removable memory module.

18. The hand-held data handling device of claim 16, wherein said optical information sensing component is capable of communicating with a computerized device.

19. The hand-held data handling device of claim 16, wherein said optical information sensing component is positioned so as to communicatively couple with a docking device when docked therewith.

20. The hand-held data handling device of claim 16, wherein said optical information sensing component comprises a bar code reader.

21. The hand-held data handling device of claim 16, further comprising a wire communication component enabling the hand-held data handling device to communicate via a wired connection.

22. The hand-held data handling device of claim 21, wherein said wire communication component enables the hand-held data handling device to communicate via a wire-linked telephonic communication system.

23. The hand-held data handling device of claim 16, wherein said housing is of a shape and size permitting the hand-held data handling device to be gripped in one hand during data entry via said screen input component.

24. The hand-held data handling device of claim 16, wherein said housing is of a shape and size permitting the hand-held data handling device to be gripped in one hand during data entry via said keyboard.

25. The hand-held data handling device of claim 16, wherein said housing is of a shape and size permitting the hand-held data handling device to be gripped in one hand during use of said optical information sensing component.

26. An apparatus, comprising:
    a housing;
    an array of depressible keys;
    a screen input system, comprising an input screen area located distinctly from said array of depressible keys, said screen input system being capable of detecting a touch to said input screen area and of determining where on said input screen area that touch has occurred;
    a visual display, located at least partially at the same location occupied by said input screen area, said visual display being capable of presenting visual information to a user;

an optical information sensing component, capable of sensing light energy reflected from an optical indicia; and a computerized processing system, communicatively coupled with said array of depressible keys, said screen input system, said visual display and said optical information sensing component;

wherein said housing is of a shape and size permitting the apparatus to be hand-held and portable such that data can be input while said housing is held in a user's hand.

27. The apparatus of claim 26, wherein said optical information sensing component comprises an optical indicia reader capable of reading machine-readable optical indicia.

28. The apparatus of claim 27, wherein said optical indicia reader comprises a bar code scanner.

29. The apparatus of claim 26, wherein said optical information sensing component is also capable of wireless communication with a computerized device.

30. The apparatus of claim 26, further comprising a housing supporting said array of depressible keys, said screen input system, said visual display, said optical information sensing component and said computerized processing system;

wherein said housing is of a shape and size permitting the apparatus to be gripped in one hand during data entry via said screen input system.

31. The apparatus of claim 26, further comprising a housing supporting said array of depressible keys, said screen input system, said visual display, said optical information sensing component and said computerized processing system;

wherein said housing is of a shape and size permitting the apparatus to be gripped in one hand during data entry via said array of depressible keys.

32. The apparatus of claim 26, further comprising a housing supporting said array of depressible keys, said screen input system, said visual display, said optical information sensing component and said computerized processing system;

wherein said housing is of a shape and size permitting the apparatus to be gripped in one hand during data entry via said optical information sensing component.

33. The apparatus of claim 26, further comprising a user-removable data storage module.

34. The apparatus of claim 26, wherein said screen input system comprises a touch screen capable of sensing where on said input screen area a user has touched said input screen area.

35. The apparatus of claim 26, wherein said array of depressible keys is located adjacent to said input screen area.

36. The apparatus of claim 26, further comprising a wire communication component enabling the apparatus to communicate with a computerized device via a wired connection.

37. An apparatus, comprising:

means for providing a hand-held, portable housing;

means for inputting data via depressible keys, located on said means for providing a hand-held, portable housing;

means for inputting data via a screen, located distinctly from said means for inputting data via depressible keys, said means for inputting data via a screen being supported by said means for providing a hand-held, portable housing;

means for displaying visual information, located at least partially at the same location occupied by said means for inputting data via a screen;

means for sensing optical information, supported by said means for providing a hand-held, portable housing; and means for processing data, supported by said means for providing a hand-held, portable housing, said means for processing data being communicatively coupled with said means for inputting data via depressible keys, said means for inputting data via screen, said means for displaying visual information and said means for sensing optical information;

wherein said means for providing a hand-held, portable housing is of a shape and size permitting the apparatus to be hand-held and portable suvh that data can be input while said means for providing a hand-held portable housing is held in a user's hand.

* * * * *

UNITED STATES PATENT AND TRADEMARK OFFICE
CERTIFICATE OF CORRECTION

| | | |
|---|---|---|
| PATENT NO. | : 7,120,319 B2 | Page 1 of 1 |
| APPLICATION NO. | : 10/085468 | |
| DATED | : October 10, 2006 | |
| INVENTOR(S) | : Arvin D. Danielson et al. | |

It is certified that error appears in the above-identified patent and that said Letters Patent is hereby corrected as shown below:

Column 14, line 32 delete "via screen" and insert --via a screen--.
Column 14, line 37 delete "suvh" and insert --such--.

Signed and Sealed this

Ninth Day of January, 2007

JON W. DUDAS
*Director of the United States Patent and Trademark Office*